United States Patent [19]
Aslam et al.

[11] Patent Number: 5,715,511
[45] Date of Patent: Feb. 3, 1998

[54] LAMINATION JACKET AND METHOD FOR FOR FUSING A TRANSFERABLE IMAGE TO A DIGITAL DISC

[75] Inventors: Muhammed Aslam, Rochester; Kathleen A. Schrock, Hamlin, both of N.Y.

[73] Assignee: Eastman Kodak Company, Rochester, N.Y.

[21] Appl. No.: 718,468
[22] PCT Filed: Jun. 17, 1996
[86] PCT No.: PCT/US96/10522
  § 371 Date: Feb. 28, 1997
  § 102(e) Date: Feb. 28, 1997
[87] PCT Pub. No.: WO97/01799
  PCT Pub. Date: Jan. 16, 1997
[51] Int. Cl.⁶ ................................. G03G 15/20
[52] U.S. Cl. ................... 399/320; 101/35; 399/1; 399/302; 399/307
[58] Field of Search ............ 399/1, 2, 130, 399/297, 301, 302, 307, 320, 328; 101/35; 347/2, 153, 155, 156, 262, 264

[56] References Cited

U.S. PATENT DOCUMENTS

| | | | |
|---|---|---|---|
| 4,064,285 | 12/1977 | Mammino | 427/24 |
| 5,233,397 | 8/1993 | Till | 399/307 |
| 5,317,337 | 5/1994 | Ewaldt | 347/2 |
| 5,320,219 | 6/1994 | Ward | 101/35 X |
| 5,428,430 | 6/1995 | Aslam et al. | 399/307 |
| 5,429,045 | 7/1995 | Karlyn et al. | 101/35 |
| 5,435,246 | 7/1995 | Edman | 101/35 X |
| 5,609,102 | 3/1997 | Rapp | 101/35 X |
| 5,629,761 | 5/1997 | Theodoulou et al. | 399/307 |

FOREIGN PATENT DOCUMENTS

| | | | |
|---|---|---|---|
| 0 581 378 | 2/1994 | European Pat. Off. | B41F 17/26 |
| 0 727 778 | 8/1996 | European Pat. Off. | G11B 7/26 |
| 2281535 | 3/1995 | United Kingdom | G03G 13/16 |
| WO 89/06375 | 7/1989 | WIPO | G03B 27/32 |

*Primary Examiner*—Sandra L. Brase
*Attorney, Agent, or Firm*—Doreen M. Wells

[57] ABSTRACT

A method for fusing a transferable image to a face of a digital disc and a lamination jacket. In the method, a transferable image is printed onto a transfer support. The transferable image is registered against the face of a digital disc to provide a transfer support-digital disc pair. The transferable image is roller laminated to the face of the digital disc. The transferable image and face of the digital disc are kept in registry during the roller laminating. The lamination jacket is for use in transporting a transfer support bearing a transferable image and a digital disc through the nip between a pair of compliant rollers to heat and pressure fuse the transferable image to the face of the digital disc. The lamination jacket has an insert. A shell is joined to the insert. The shell is exterior to the insert. The shell and insert define a pocket for closely receiving the digital disc. The lamination jacket has at least one guide for registering the digital disc and transfer support within the pocket.

10 Claims, 5 Drawing Sheets

LAMINATION JACKET AND METHOD FOR FOR FUSING A TRANSFERABLE IMAGE TO A DIGITAL DISC

FIELD OF THE INVENTION

The invention relates to methods and apparatus pertaining to digital discs: compact digital discs, photo compact discs, and other similar media. The invention more particularly relates to a method for fusing a transferable image to a digital disc and a lamination jacket useful in that method.

BACKGROUND OF THE INVENTION

The term "electrophotographic printer" is used hereafter to refer generically to electrostatographic copiers and printers, unless otherwise indicated by context.

The term "digital disc" is used herein to refer generically to an article of digital storage media that takes the form of a thin and rigid disc of unitary structure. A digital disc has a surface, referred to herein as the "face", available for display of printed information. Information stored on a digital disc is generally in optically readable form; however, magnetic storage is not excluded.

Digital discs are finding increasing use in the high density storage of digital information, such as digitized music, digitized photographs, and computer programs. At present, three principal types of digital discs are in common use. The first type, referred to as a CD or ROM (read only memory) disc, is manufactured by pressing depressions into a substrate, in a manner analogous to the manufacture of phonograph records. A second type of digital disc, referred to as a writable optical storage disc, has the capability of having information recorded (written) thereon at some time after fabrication of the medium. A third type, referrred to as an erasable disc, can also have information added after fabrication, but that information can be erased or modified at a later time.

A digital disc has a substrate overlaid with a layer that stores the digital information. The substrate is transparent to the radiation used to read the disc. Overlying the storage layer is a protective layer. The surface of the protective layer commonly bears printed information. U.S. Pat. No. 5,317,337 teaches a method for printing the face of an digital disc using an ink jet printer. Alternative methods or printing, including solid-ink printing, thermal-transfer technology, dye-diffusion methods, and color laser printing are mentioned in relation to an article in periodical "Computer Design". U.S. Pat. No. 5,282,187 teaches the use of a felt tip pen or the like to mark the face of a compact disc.

Digital discs are most often marketed with one or more pieces of human readable printed material. For convenience, the term "information package" is used herein to refer to the information included for the user, in a digital disc of whatever type, along with the information printed on the accompanying printed media. Commonly, a digital disc is marketed in a plastic storage box, commonly referred to as a "jewel box". A jewel box, typically has a transparent base that includes a folded sheet of informational printed media, referred to herein as a "backplate", covered by an insert (commonly opaque) that grips the digital disc. A transparent cover is hinged to the base. A booklet having one or more sheets of folded printed media, referred to herein as an "insert booklet", is commonly held by the cover. U.S. Pat. No. 4,709,812 teaches a printed, folded paperboard alternative to a jewel box.

U.S. Pat. Nos. 5,163,271, 5,207,050, and 5,285,620 teach apparatus and methods for assembling digital discs and literature into jewel boxes or the like.

The above methods have the shortcoming that the printing of a digital disc and its accompanying literature are not produced by the same printer at the same time. This presents a problem if it is desired to match the colors of pictorial copy on both the face of a digital disc and on accompanying literature, particularly if it is impractical to proof the color match before a product run. A particular situation in which it is impractical to proof colors is the preparation of individual digital disc information packages on demand.

It would be desirable to provide a method for fusing a transferable image to a digital disc and a lamination jacket useful in that method.

SUMMARY OF THE INVENTION

The invention provides a method for fusing a transferable image to a face of a digital disc and provides a lamination jacket. In the method, a transferable image is printed onto a transfer support. The transferable image is registered against the face of a digital disc to provide a transfer support-digital disc pair. The transferable image is roller laminated to the face of the digital disc. The transferable image and face of the digital disc are kept in registry during the roller laminating. The lamination jacket is for use in transporting a transfer support bearing a transferable image and a digital disc through the nip between a pair of compliant rollers to heat and pressure fuse the transferable image to the face of the digital disc. The lamination jacket has an insert. A shell is joined to the insert. The shell is exterior to the insert. The shell and insert define a pocket for closely receiving the digital disc. The lamination jacket has at least one guide for registering the digital disc and transfer support within the pocket.

It is an advantageous effect of at least some of the embodiments of the invention that a method is provided for fusing a transferable image to a digital disc and a transfer support is provided having a low surface energy transfer layer, which method and transfer support can be used to produce digital discs having good quality fused toner images. By using the method of the invention, it is possible to match the copy on both the face of a digital disc and on the accompanying literature.

BRIEF DESCRIPTION OF THE FIGURES

The invention itself will be better understood by reference to the following description of an embodiment of the invention taken in conjunction with the accompanying figures wherein.

DESCRIPTION OF PARTICULAR EMBODIMENTS

In the method of the invention, a transferable image is registered and fused to the face of a digital disc.

Figure 1:
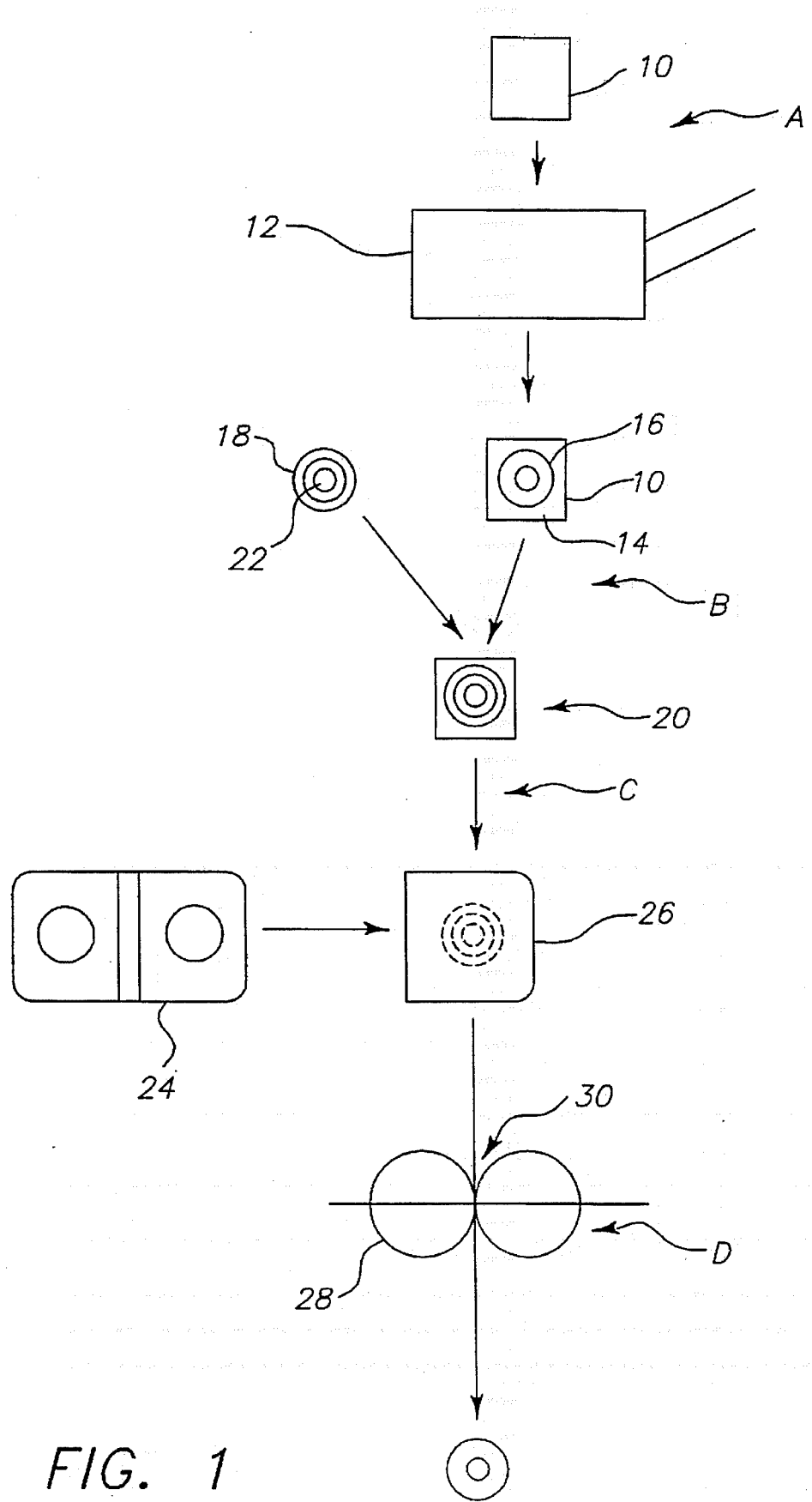
FIG. 1 is a diagrammatical view of an embodiment of the method of the invention.

Referring now to FIG. 1, in step A, a transfer support 10 is first printed with a toner image using an electrophotographic printer 12. The transfer support 10 has a transfer surface or transfer layer 14 of a material that is capable of bearing what is referred to herein as a "transferable toner image" or "transferable image". The transferable image is identified by the reference numeral 16. A transferable image 16 is characterized as being "unfused". The term "unfused" is slight misnomer. In an electrophotographic printer 12, a toner image is initially formed of discrete particles of toner which are then fused to each other and to a receiver. In the method of the invention, toner particles on the transfer support 10 are fused to each other to form the "transferable toner image". There is sufficient adherence of the transferable toner image 16 to the transfer support 10 so as to prevent significant offset, that is, retention of a portion of toner image on the fusing system of the printer 12. The transferable toner image 16 is not so adhered to the transfer support 10 that it will not transfer to a digital disc 18 placed in contact with the transferable toner image 16 under conditions substantially the same as those in the fusing system of the electrophotographic printer 12.

The transfer surface 14 of the transfer support 10 is a low surface energy release material that has an adhesive strength, relative to the transferable toner image, that is within a selected range that allows the transfer support to retain and then release the transferable toner image. This adhesive strength is expressed herein as a peel force, (peel forces herein are measured at 90°). The transfer support has a surface energy that is insufficient to retain a transferable toner image subject to a peel force of greater than about 550 Newtons/meter.

Preferably transfer supports disclosed in U.S. Provisional application Ser. No. 60/000,638 filed concurrently herewith entitled "TRANSFER SUPPORT AND METHOD FOR FUSING A TRANSFERABLE IMAGE TO A DIGITAL DISC", have a surface energy that is insufficient to retain a transferable toner image subject to a peel force of from 3 to 15 Newtons/meter. Suitable materials for the transfer layer include alkyl fluorophosphonates and certain amorphous perfluorocarbons. The alkyl fluorophosphonates have the general structure:

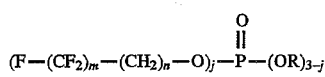

where j is 1 or 2; m is from about 3 to about 8; n is from about 1 to about 6; and R is selected from the group consisting of $NH_4$ and H. One example of a commercially available alkyl fluorophosphonate is identified by the general structure:

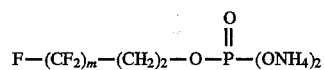

where m is from 3 to 8. This material is available from E. I. du Pont de Nemours and Co. of Wilmington, Del., under the designation: "Zonyl™FSE". Zonyl™ FSE has a surface energy of from 16 to 20 dynes/cm. Another commercially available alkyl fluorophosphonate is identified by the general structure:

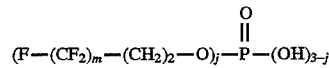

where m is from 3 to 8 and j is 1 or 2. This material is available from E. I. du Pont de Nemours and Co. under the designation: "Zonyl™ UR". Zonyl™ UR has a surface energy of from 16 to 20 dynes/cm.

The amorphous perfluorocarbons have the general structure:

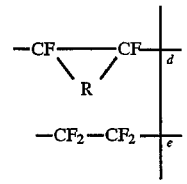

where R represents the atoms and electrons necessary to complete a perfluoro ring having a total of 5 carbons and heteroatoms, and d and e are mole fractions having a sum of 1. Some specific examples of a commercially available amorphous perfluorocarbons are identified by the general structure:

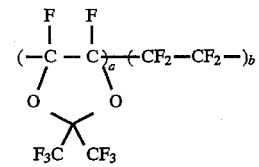

where a and b are mole fractions having the sum of 1. An amorphous perfluorocarbon having this structure where a=0.65 and b=0.35 is available from E. I. du Pont de Nemours and Co under the designation: "Teflon™ AF 1600. Another amorphous perfluorocarbon having this structure where a=80 and b=20 is available from E. I. du Pont de Nemours and Co under the designation: "Teflon™ AF 2400". Teflon™ AF 1600 and Teflon™ AF 2400 are aqueous or non-aqueous copolymerization products of tetrafluoroethene and 2,2-bis(trifluoromethyl)-4,5-difluoro-1,3-dioxolane. The glass transition temperature ($T_g$) of Teflon™ AF materials is a function of the relative mole fractions of a and b. Teflon™ AF 1600 has a $T_g$ of 160° C. Teflon™ AF 2400 has a $T_g$ of 240° C. Suitable $T_g$'s for the material of the transfer surface 14 are in the range of about 35° C. to about 300° C.

The transfer surface 14 is substantially free of "bare spots" or other artifacts which would adversely affect the final image. The transfer support 10 can have a uniform composition or can have a support layer covered by a transfer layer of suitable material. The transfer layer and transfer support 10 are not limited to any particular configurations, however, it is preferred that the transfer support 10 take the form of a discrete sheet. The transfer support 10 can be part of a larger structure, such that the transfer layer covers only a portion of the support.

The transfer layer is not limited to a particular thickness, however, it is desirable that the transfer layer be thin so as to minimize usage of the low surface energy material. Since excessive Surface roughness of the transfer layer tends to cause areas of the toner image to be retained on the transfer layer after fusing of the transferable toner image, the transfer layer should be sufficiently smooth to ensure substantially complete transfer of the toner image to the digital disc. For a thin transfer layer, surface roughness reflects the roughness of the underlying support layer, thus, a smooth support layer should be used.

A thin, smooth transfer layer can be conveniently provided by gravure coating or stamp coating a 0.5 to 2.0 micrometer thick layer of the low surface energy material onto a sheet of high quality graphic arts paper or laser printer paper. For example, the support layer can be a sheet of high-clay, acid-sized paper having a Sheffield smoothness of from about 120±40 to about 160±40. Specific examples of suitable papers are "Spectratech Laser Gloss™" electrophotographic paper, marketed by Scott Paper Company, of Boston, Mass., and "Vintage Velvet™" graphic arts paper, marketed by Potlatch corp., of San Francisco, Calif. The support layer is not limited to paper, but can be transparency material or other material suitable for use as an electrophotographic receiver, that is adequately smooth and meets other requirements of a particular use.

The transfer support 10 can be part of a sheet of specialized media, referred to herein as a "partial transfer sheet". A partial transfer sheet has a primary layer that is copy paper or transparency material or other material suitable for use as an electrophotographic receiver. Overlaying a portion of the primary layer is a secondary layer of release agent having a low surface energy. The sheet can thus be divided into a literature portion having only the primary layer and a transfer support 10 or transfer support 10 having both primary and secondary layers. Both portions can be printed simultaneously, yielding an "unfused" transferable image 16 on the transfer support 10 and a "fused", untransferable toner image on the literature portion.

A preferred electrophotographic printer 12 for use in the method of the invention is a Kodak™ ColorEdge™ Model 1550+, marketed by Eastman Kodak Company of Rochester, N.Y.

The transferable image 16 is printed onto the transfer support 10 in a mirror image orientation. The transferable image 16 can include color pictorial information or other information subject to electrophotographic printing, such as magnetically readable characters. The transferable image 16 may be opaque or semi-transparent. In the latter case, it may be desirable to accomodate the color balance of the image with the coloration of the face of the digital disc 18. Such adjustments of color balance can be conveniently provided by digital manipulation of the image by methods well known to those skilled in the art or, for particular embodiments of the invention, by a method disclosed in a U.S. Patent Application, entitled: "COMPOSITE SHEET AND METHODS FOR PRINTING DIFFERENTLY-TRANSFORMED IMAGES USING COMPOSITE SHEET", filed concurrently herewith, by Eric Zeise (which is hereby incorporated herein by reference). Color balance could also be addressed by the use of white ink or white toner to modify the coloration of all or part of the face of the digital disc.

Image information used by the printer 12 can be supplied a variety of ways well known to those skilled in the art. Information can be supplied from a hard or floppy disc in a microcomputer. Information can be supplied by a scanner, or the equivalent portion of a copier. Information can be supplied from a remote source via a computer interface.

Referring again to FIG. 1, step B illustrates the placement of the transfer support 10 and the face 22 of a digital disc 18 to form a transfer support-digital disc pair 20. The face 22 of the digital disc 18 and the transferable toner image 16 are juxtaposed and the transfer support 10 and digital disc 18 are in registration. The transferable image 16 is located on the transfer support 10 such that, when the transfer support 10 and digital disc 18 are in registry, then the transferable toner image 16 and digital disc 18 will also be registered.

Step C illustrates the placement of the transfer support 10 and digital disc 18 within a lamination jacket 24. The lamination jacket 24 maintains registration and protects the transfer support-digital disc pair 20 during fusing. It should be understood that steps B and C are illustrated as separate procedures in FIG. 1 for the sake of clarity. Steps B and C can be performed as shown in FIG. 1, or in reverse order; but it is generally most convenient to combine steps B and C as a single procedure.

Figure 5:
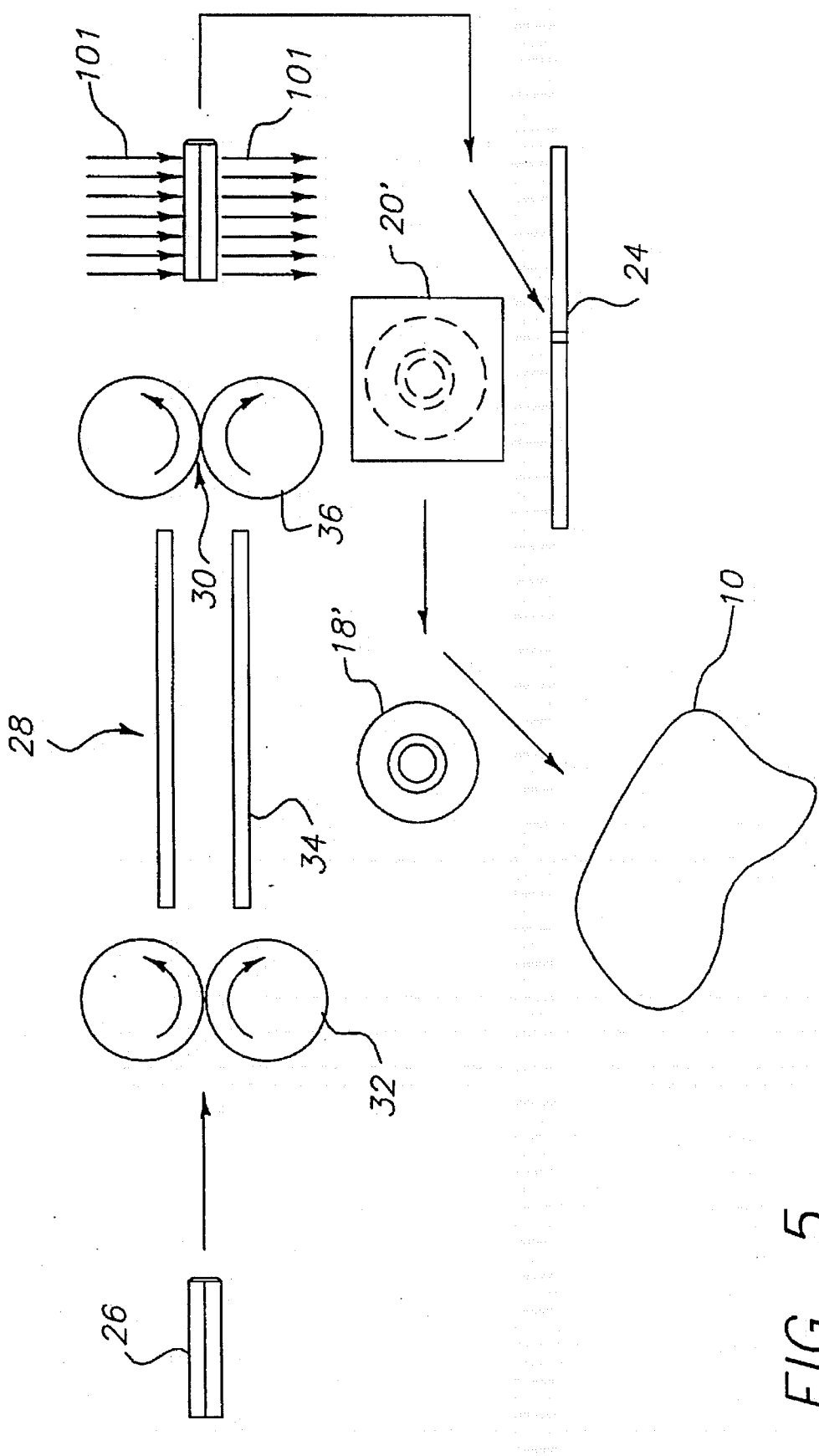
FIG. 5 is a detailed diagrammatical view of step D of the method of FIG. 1.

Referring to step D of FIG. 1 and to FIG. 5, the filled jacket 26; that is, the lamination jacket 24, disc 18, and transfer support 10; is then fed through a fuser 28 and the transferable toner image 16 is fused to the juxtaposed face 22 of the digital disc 18. Fusing can be provided by heat, or pressure, or a combination of the two. In currently preferred embodiments of the methods of the invention, fusing occurs as a result of heating the transferable toner image 16 and pressing the heated transferable image 16 against the face 22 of the digital disc 18. The heat and pressure are applied by roller laminating the transferable image 16-digital disc 18 pair. The term "roller laminating" and similar terms are used herein to refer to procedures in which pressure is applied by moving an object through the nip 30 between a pair of rollers or through other structures that apply heat and pressure in a similar manner. For example, an object can be roller laminated by supporting the object on a flat plate and rocking a curved heated platen over the object. As a matter of convenience, the term "rollers" is used generally herein to refer to both actual rollers and other roller lamination components.

Figure 6B:
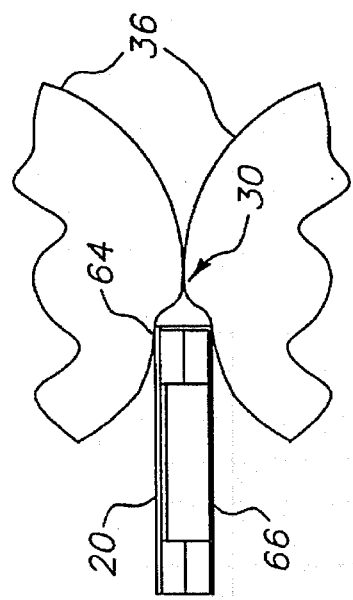
FIGS. 6a–6d are semi-diagrammatical views of the fusing procedure of the method of FIG. 1.
Figure 6D:
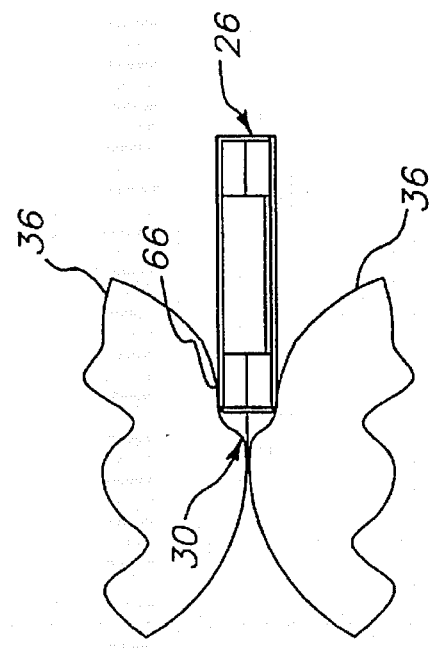
Figure 6A:
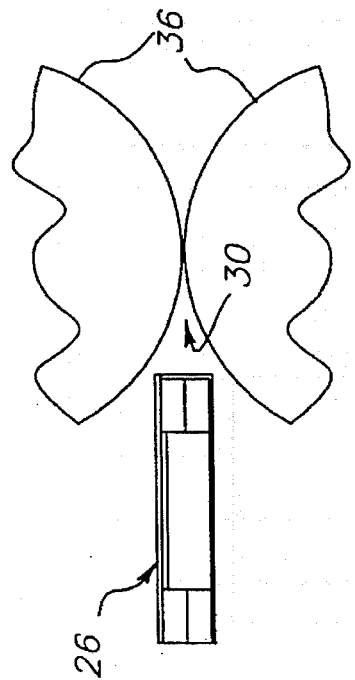
Figure 6C:
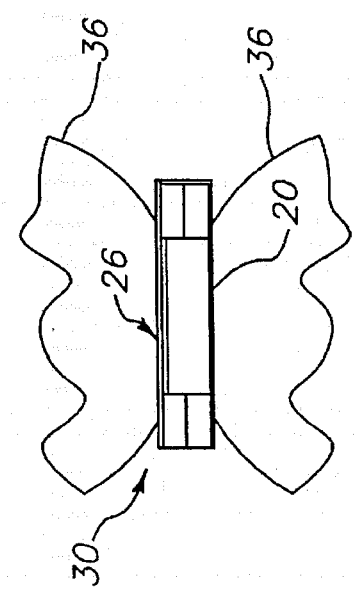

Referring now to FIG. 5, it is highly preferred that the fuser 28 be compliant, that is, that the "nip 30" be subject to enlargement by the passage of the transfer support-digital disc pair 20. A currently preferred fuser is shown in FIG. 5. The filled jacket 26 is roller laminated by being fed to a pair of feed rollers 32 and then between a pair of heated plates 34, and through the nip 30 between a pair of compliant fusing rollers 36. In this fuser 28, nip 30 is indirectly heated. Rollers 36 can also be directly heated by internal heating elements (not shown) or the like. The lamination jacket 24, as discussed in detail below, not only keeps registration and generally protects the transfer support 10 and digital disc 18, but also maintains a substantially uniform pressure on the transfer support-digital disc pair 20 during the fusing step. The lamination jacket 24 does so, by enlarging the nip 30, that is, deflecting the compliant fuser 28 outward from the nip 30, before the transfer support-digital disc pair 20 enters and after the transfer support-digital disc pair 20 exits. The resulting constant nip size, for the transfer support-digital disc pair 20, provides the substantially uniform pressure. The deflection of compliant fusing rollers 36 and enlargement of nip 30 is shown in FIGS. 6a–6d. In FIG. 6a, the filled jacket 26 is fed into the nip 30. In FIG. 6b, the leading drift 64 causes full deflection of nip 30 prior to entry of the transfer support-digital disc pair 20 into nip 30. In FIG. 6c, the transfer support-digital disc pair 20 passes through the fully deflected nip 30. In FIG. 6d, the nip 30 is held fully deflected by trailing drift 66, until transfer support-digital disc pair 20 has completely exited the nip 30.

After fusing, the filled jacket 26 is cooled, indicated diagrammatically in FIG. 5 by arrows 101, and is then opened and the fused transfer support-digital disc pair 20' is removed. The completed labelled digital disc 18' is separated from the lamination jacket 24 and used transfer support 10. The used transfer support 10 and lamination jacket 24 can be discarded or, if undamaged, can be reused.

Referring now to FIGS. 2–4 and 7–8, the lamination jacket 24 of the invention has a shell 38 which defines a pocket 40 for closely receiving the transfer support 10 and the digital disc 18. The shell 38 has opposed upper and lower flaps 42,44. The flaps 42,44 have front and rear flap margins 46,48 defining an axis of travel (indicated by arrow 50) of the lamination jacket 24 through the fuser 28. The flaps 42,44 are movable relative to each other between an open or separated configuration 52 in which the flaps 42,44 are spaced apart and a closed or juxtaposed configuration 54 in which the flaps 42,44 are overlapped. The flaps 42,44 are preferably joined together by a hinge 56.

The pocket 40 has a depth dimension, indicated by arrow 58, substantially perpendicular to the axis of travel and length and width dimensions substantially aligned with the larger dimensions of the flaps 42,44. The pocket 40 can be formed as a result of compliance of the flaps 42,44 about an interleaved transfer support 10 and digital disc 18. It is preferred, however, that the pocket 40 defined by the flaps 42,44 be further defined by an insert 60 disposed interior to the shell 38. The shell 38 and insert 60 can be made from a single unitary structure; however, in a currently preferred embodiment of the invention, the shell 38 and insert 60 are discrete structures permanently adhered together.

It is further preferred that the insert 60 have a collar 62, a leading drift or leading edge section 64, a trailing drift or trailing edge section 66. The drifts 64,66 are forward and rearward of the collar 62, respectively. The collar 62 adjoins the pocket 40. In a particular embodiment of the invention the collar 62 extends from the leading drift 64 to the trailing drift 66. The insert 60 can be a unitary structure or can comprise several pieces. The collar 62 can be deleted such that the insert 60 consists of leading and trailing drifts 64,66. The insert 60 can be limited to a single drift 64 or 66, but this is not preferred.

The materials used for the lamination jacket 24 must be sufficiently compliant such that pressure imposed on the shell 38 is substantially transferred to the transfer support-digital disc pair 20. On the other hand, it is undesirable for the lamination jacket 24, and in particular the shell 38, to be so limp that the flaps 42,44 readily assume a plurality of closed configurations. It is instead highly preferred that the materials used for the lamination jacket 24 are sufficiently stiff that the hinge 56 biases the flaps 42,44 against assuming configurations in which the flaps 42,44 are skewed relative to each other.

The shell 38 and insert 60 can be made as a single unitary structure or can take the form of separate components joined together. The shell 38 and insert 60 can also be partially unitary. For example, the insert 60 and part of the shell, such as an inner layer, can form a unitary structure having one or more additional shell layers adhered over the outside.

The lamination jacket 24 can be made from low cost materials such as papers and plastic films; however, the lamination jacket 24 must be configured to alleviate any undesirable characteristics of materials used. For example, it is highly desirable that the lamination jacket 24 not offset onto the fuser 28 during use and that moisture be excluded from the transfer support-digital disc pair 20 during fusing. Some plastics readily offset at fusing temperatures and pressures. Papers have high moisture contents.

Figure 2:
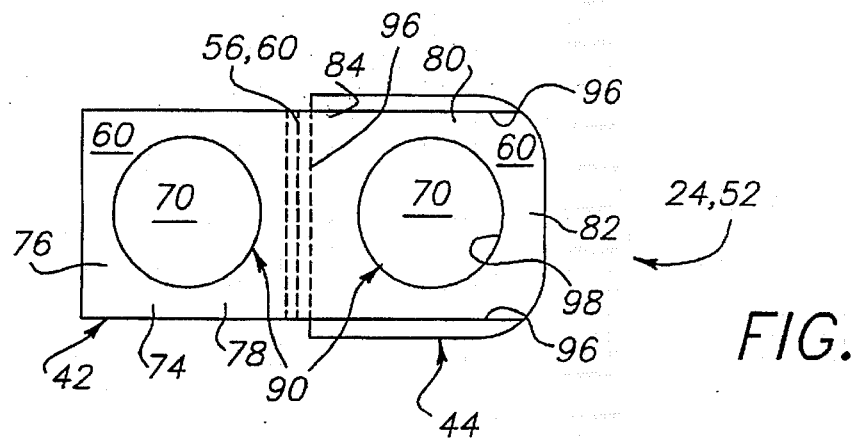
FIG. 2 is a top plan view of an embodiment of the lamination jacket of the invention in an open configuration. The hinge is indicated by dashed lines.
Figure 3A:
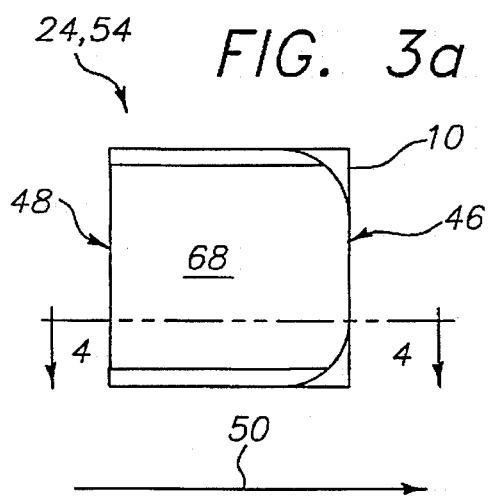
FIG. 3a is a top plan view of the lamination jacket of FIG. 2 in a closed configuration and filled with a transfer support and digital disc.
Figure 3B:
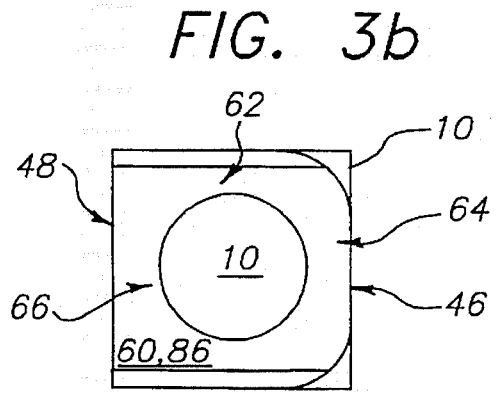
FIG. 3b is the same view as in FIG. 3a, except that the shell of the lamination jacket is removed.
Figure 4:
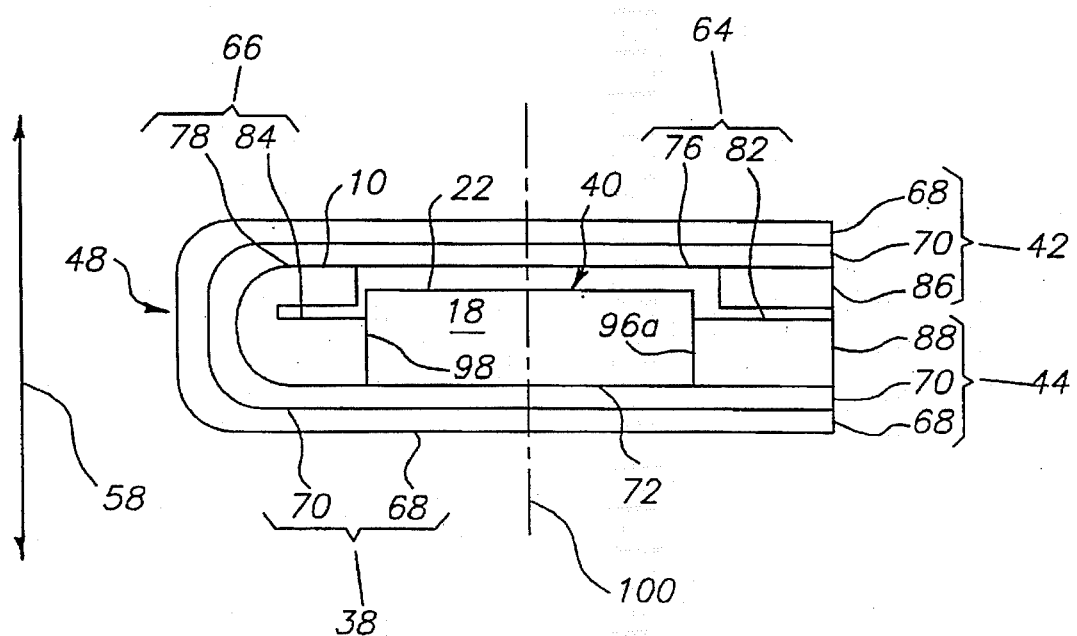
FIG. 4 is a cross-sectional view of the filled jacket of FIG. 3 taken substantially along line 4—4.

An example of a lamination jacket 24 of the invention that overcomes these shortcomings is shown in FIGS. 2–4. The shell 38 has two layers 68,70. A non-offset layer 68 of paper is disposed on the outside. A moisture barrier layer 70 of plastic film is disposed on the inside between the non-offset layer 68 and the insert 60. Suitable materials for the moisture barrier layer 70 include polyester and polypropylene. The insert 60 is a moderately stiff, heavy stock paper like bristol board. A variety of other materials could also be used for the layers 68,70, taking into consideration the conditions encountered within the nip 30. For example, the glass transition temperature of polymers used should not be below the temperatures encountered in the nip.

Referring again to FIGS. 2–4, when the lamination jacket 24 is in closed configuration 54, the digital disc 18 contacts the insert 60 only along the circumference of the disc 18. The bottom 72 of the disc 18 contacts the moisture barrier layer 70 of the shell 38. The face 22 of the disc 18 contacts the transfer support 10, which also mostly contacts the shell 38 rather than the insert 60. The result is that the moisture barrier layer 70 substantially moisture-proofs the transferable image 16 and digital disc 18 relative to the paper insert 60 during fusing. The non-offset layer 68 protects the moisture barrier layer 70 from the fuser 28 so that the shell 38 is substantially free from offset at a temperature and pressure sufficient to fuse the transferable image 16 to the digital disc 18.

The shell 38 is preferably configured to extend over the entire bottom of the digital disc 18 and the backside of the transfer support 10 to substantially isolate the transferable image 16 and digital disc 18 from the fuser 28 and protect against scuffing or other mechanical injury during transport. Referring now to FIGS. 3a–3b, extreme corners of the lamination jacket 24 can be left as sharp points or can be radiused or the like, as desired. If the transferable image 16 is rectangular, then radiused corners can provide a visual reference as to whether a transfer support 10 has been placed within the lamination jacket 24.

The leading drift 64 adjoins the front flap margin 46. The trailing drift 66 adjoins the rear flap margin 48. The drifts 64,66 are each transverse to the axis of travel 50 and tangential or substantially tangential to the pocket 40. In the embodiment of the lamination jacket 24 of FIGS. 2–4, the drifts 64,66 each have substantially the same width dimension as the pocket 40 in a direction substantially perpendicular to the axis of travel 50. Drifts 64,66 having a width-wise extension that is less than that of the pocket 40 are not considered optimal. Extension of drifts 64,66 substantially beyond the pocket 40 in the directions of the width dimension is not considered critical, but can be provided as a matter of design convenience.

During fusing the drifts 64,66 force resilient expansion of the nip 30 forward of the transfer support-digital disc pair 20 and allow resilient contraction of the nip 30 rearward of the transfer support-digital disc pair 20. This provides a substantially uniform area within the nip 30 during fusing of the toner image, so as to minimize non-uniformities in the pressure applied by the compliant rollers to the face 22 of the disc 18. When the lamination jacket 24 passes between the compliant rollers 36, the nip 30 expands and contracts in spaced relation to the pocket 40 and maintains a substantially constant dimension as the pocket 40 passes through the nip 30. Non-uniform pressure or areas of excess pressure, are apparently due to less area within the nip 30, and were determined to be related to localized smearing of the toner image.

It is currently preferred that the drifts 64,66 expand the nip 30 to the same extent as the transfer support-digital disc pair 20. This can be provided by a lamination jacket 24, that is made of relatively incompressible materials and that, at least when filled, has a constant thickness. The lamination jacket 24 of FIGS. 2–4 and 7 meet this provision. The drifts 64,66 each have a constant thickness that is substantially the same as the depth of the pocket 40 and the thickness of the transfer support-digital disc pair 20. Since the transfer support 10 is ordinarily thin, the thickness of the drifts 64,66 is also substantially the same as the thickness of the digital disc 18. For example, 50 mils is a suitable thickness for drifts 64,66 for use with a commonly used variety of digital disc 18 having a standarized thickness of about 50 mils.

In the embodiment of the lamination jacket of FIGS. 2–4, the collar 62 and drifts 64,66 each have an upper subunit 74,76,78, respectively, and a lower subunit 80,82,84, respectively. The upper subunits 74,76,78 together define a unitary upper half-insert 86. The lower subunits 80,82,84 together define a unitary lower half-insert 88. The two half-inserts 86,88 together have substantially the same thickness as the digital disc 18, that is, a thickness that is substantially equal to the depth of the pocket 40. The upper half-insert 86 is joined to the upper flap 42. The lower half-insert 88 is joined to the lower flap 44. The half-inserts 86,88 are displaceable relative to each other between an open or spaced apart configuration and a closed or juxtaposed configuration. The half-inserts 86,88 each have a cut-out 90. The cut-outs 90 have outer ends that are occluded by the shell 38 and inner ends that are substantially aligned when the half-inserts 86,88 are in the closed conformation. The cut-outs 90 together define continuous lateral boundaries for pocket 40, which is shaped like a short cylinder having a diameter only slightly larger than the diameter of the digital disc 18 and a depth that is substantially equal to the thickness of the digital disc 18. It is convenient if each half-insert 86,88 has a uniform thickness equal to about half the thickness of the digital disc 18.

The lamination jacket 24 includes transfer support and digital disc guides 96,98 for registering the transfer support 10 and digital disc 18 within the pocket 40. The transfer support 10 and digital disc 18 are both registered relative to the lamination jacket 24, and thus registered relative to each other. With the lamination jacket 24 in the open configuration 52, the guides 96,98 aid in the placement of the transfer support 10 and digital disc 18 within the lamination jacket 24, by inhibiting lateral movement once the digital disc 18 or transfer support 10 has attained a registration position. With the lamination jacket 24 in closed configuration 54, the guides 96,98 help inhibit relative movement of the transfer support 10 and digital disc 18 during fusing. The guides 96,98 adjoin one or both flaps 42,44.

The guides 96,98 can provide registration in one or two dimensions. Movement of the transfer support-digital disc pair 20 in a first dimension parallel to the central axis 100 of the digital disc 18 is constrained by the overall configuration of the lamination jacket 24 and by the fuser 28. The guides 96,98 constrain movement in one or both of the the two dimensions, referred to herein as "length" and "width", perpendicular to the central axis 100 of the digital disc 18. It is preferred that guides 96,98 constrain movement of the transfer support 10 and digital disc 18 in length and width dimensions.

Figure 8:
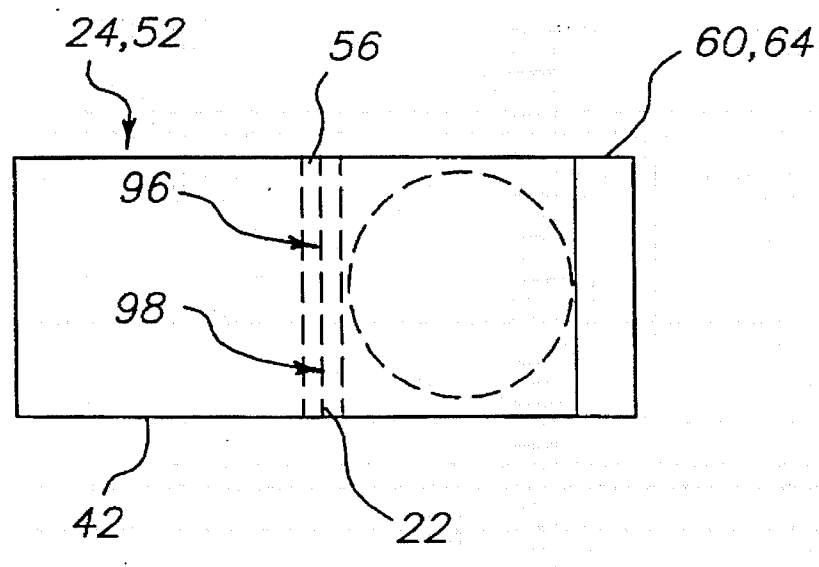
FIG. 8 is a top plan view of yet another embodiment of the lamination jacket of the invention.

FIG. 8 illustrates an embodiment of the lamination jacket 24 of the invention having guides 96,98 that provide registration in one dimension. The transfer support and digital disc guides 96,98 are adjoining portions of the inner surface 22 of the hinge 56. The transfer support 10 and digital disc 18 both can be abutted against the hinge 56 to provide registration in a direction parallel to the length dimension of the lamination jacket 24. Registration parallel to the width dimension of the lamination jacket 24 is provided manually and is maintained by frictional resistance of the lamination jacket 24.

A convenient configuration for the digital disc guide 98 that provides length and width registration is a continuous or discontinuous ring that closely fits with a complementary structure on the digital disc 18. If the ring is discontinuous, it preferably has three or more contact points spaced to limit disc movement in length and width dimensions. The digital disc guide 98 can closely fit the outer edge of the digital disc 18 or a complementary structure on the digital disc 18, for example, an annular indentation near the inner margin. In an embodiment of the invention shown in FIGS. 2–4, the digital disc guide 98 is a portion of the rim of the pocket 40.

The configuration of the transfer support guide 96 depends upon the configuration of the transfer support 10. For example, if the transfer support 10 is circular in outline and about the same diameter as the digital disc 18, then the transfer support guide 96 is a portion of the rim of the pocket 40. If the transfer support 10 is rectangular or square in outline, then the transfer support guide 96 can be appropriately located tabs or edges protruding from the insert 60 or shell 38. The lamination jacket 24 shown in FIGS. 2–4, can utilize both disc-shaped and rectangular transfer supports. The rim of cut-outs 90 has an upper portion that defines guide 96a, which can engage disc-shaped transfer supports, and a lower portion that defines guide 98, which can engage discs.

Figure 7:
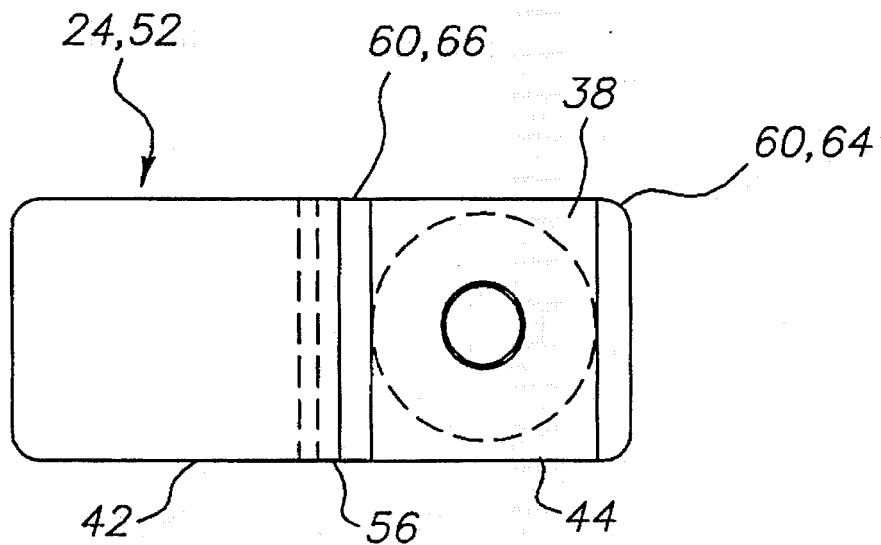
FIG. 7 is a top plan view of another embodiment of the lamination jacket of the invention.

FIG. 7 illustrates an embodiment of the lamination jacket 24 of the invention in which the transfer support guide 96 consists of the inner edges of drifts 64,66. Registration is provided by the guide 96 only in the length dimension. Registration in the width dimension is provided manually. The digital disc guide 98 has the form of a raised annulus extending inward into pocket 40 from layer 70 of shell 38, that mates with a complementary indentation in digital disc 18 and provides registration in length and width dimensions.

Tolerances for the guides 96,98 are determined by acceptable tolerances for the position of the image on the completed disc 18. Ordinarily rotation of the position of the transferable image 16 about the axis 100 of the disc 18 is inconsequential. Thus the primary tolerance at issue for locating the transferable image 16 on the digital disc 18 is the radial offset of the center of the image from the axis 100 of the digital disc 18. An example of a suitable tolerance is 1 millimeter in radial offset.

With transfer supports 10 having a circular or other radially symmetrical outline, alignment of the transfer support 10 and digital disc 18 about a common center can be easily established solely by use of appropriately sized guides. With rectangular transfer supports or transfer supports having a non-centered transferable image or the like, it may be convenient to provide one or more visible indicators (not shown) as registration aids on the transfer support 10, and, if desired, on the lamination jacket 24. For example, the transfer support 10 and lamination jacket 24 can include matching arrows or other visible indicators to aid an operator in properly orienting the transfer support 10 relative to the lamination jacket 24. A visible indicator can be located in a "waste" section of the transfer support 10.

In use, referring, for example, to the embodiment of the invention shown in FIGS. 2–4, the lamination jacket 24 is opened, a digital disc 18 is placed in one of the cut-outs 90, a circular transfer support 10 is placed in the other cut-out 90, and the jacket is closed to superimpose the two cut-outs 90. After fusing and cooling, the lamination jacket 24 is opened. The transfer support-digital disc pair 20 is removed from the lamination jacket 24. The transfer support 10 is stripped off, resulting in the completed digital disc 18' bearing a fused toner image (not indicated in figure). The completed digital disc 18' is then assembled with any accompanying literature and packaging (not shown). Post-fusing steps can be performed manually or by automated equipment comparable to that currently used in production of packaged digital discs.

The lamination jacket has been described particularly in relation to its use in the method of the invention. The lamination jacket of the invention is not limited to use in the method of the invention. For example, after fusing, the lamination jacket can be retained on the completed digital disc and used as protective packaging during shipping. Printed indicia of the contents and other information can be provided on the lamination jacket.

The following Examples and Comparative Examples are presented to further illustrate some preferred modes of practice of the method of the invention. Unless otherwise indicated, all starting materials were commercially obtained.

EXAMPLE 1

A full color image was photocopied onto a transfer support. The resulting transfer support was cut to provide a circular image having about the same circumference as a digital disc. A piece of paper about 0.0762–0.127 millimeters (0.003–0.005 inches) thick was cut and then folded once to provide a square jacket having two larger dimensions slightly greater than the diameter of the digital disc. The transferable image and digital disc were aligned, with the toner image and face of the digital disc in contact, and placed into the jacket such that the fold line engaged both the digital disc and the transferable image. The resulting jacket, digital disc, and transferable image, referred to collectively herein as a "filled jacket", was then roller laminated using a Model No. 6000 laminator from Laminating Arts of New York Inc. This device has a set of feed rollers having a diameter of 19.05 millimeters (0.75 inches) and a set of similarly sized pressure rollers. A pair of heater plates adjoin the path between the pressure and feed rollers. The laminator provides a fusing pressure of 2.89–5.79 kg/cm$^2$ (50–100 pounds per square inch). The temperature and speed controls were modified so as to expose the filled jacket to a temperature of 175° (350° F.) at a speed of 11.43 millimeters per second (0.45 inches per second).

After lamination, the filled jacket was cooled and the backing was separated from the fused image. The face of the digital disc was found to be fogged with moisture from the paper of the jacket and the leading and trailing portions of the fused image were smeared.

EXAMPLE 2

The procedures of Example 1 were substantially repeated with the exception that the paper jacket was replaced by a similarly configured jacket of 0.058–0.0762 millimeters (0.002–0.003 inch) thick polyester film, Mylar™ brand from DuPont.

After lamination, no fogging was seen; however, the outer jacket surface in contact with the laminator offset onto the heating plates. The leading and trailing portions of the fused image were smeared.

EXAMPLE 3

The procedures of Example 1 were substantially repeated with the exception that the paper jacket was replaced by a similarly configured jacket having a multilayer shell. The inner layer was 0.0508–0.0762 millimeters (0.002–0.003 inch) thick Mylar™ film. The outer layer was 3–5 mil 0.0762–0.127 millimeters (0.003–0.005 inches) thick paper.

After lamination, no fogging was seen and there was no offset of jacket materials onto the laminator; however, smearing of leading and trailing portions of the fused image was observed.

EXAMPLE 4

The procedures of Example 3 were substantially repeated except that the jacket was replaced by a similarly configured jacket having a leading drift inserted between the flaps at the front edge of the jacket. The leading drift was a rectangular piece of cardboard having its longest dimension equal to the transverse dimension of the jacket. The thickness of the leading drift was the same as that of the digital disc, about 1.27 millimeters (0.050 inches).

After lamination, no fogging was seen and there was no offset of jacket materials onto the laminator, and there was no smearing of the leading portion of the image. Smearing of the trailing portion of the fused image was observed.

The procedure was repeating for additional digital discs and transferable images varying the material used for the transfer layer: Teflon™ AF 1600 or Zonyl™ FSE, varying the speed from about 0.635 to 2.54 cm/sec (0.25 to 1.0 ips), varying the temperature of the heated plates from about 149° to 204° C. (300° to 400° F.), and varying the pressure from about 50 to 100 psi. Comparable results were observed.

EXAMPLE 5

The procedures of Example 3 were substantially repeated except as follows.

A multilayer shell was prepared as described in Example 3. The multilayer shell when opened was about 31.8 cm (12.5 inches) by 12.7 cm (5 inches). Corners were radiused in about 0.64 cm (0.25 inch). An insert of 0.635 mm (0.025 inches) cardboard was adhered to the inside surface (the Mylar™ surface) of the multilayer shell. The insert was comprised of two halves, each about 12.7 cm (5 inches) by about 15.2 (6 inches), joined by a folded paper hinge. Each half-insert had a circular central cut-out about 12.1 cm (4.75 inches) in diameter.

The jacket was opened and digital disc was placed inside one of the cut-outs using the rim of the cut-out as a guide. The transfer support was then placed over the digital disc with the edge of the transfer support touching the hinge and was then further aligned visually with the digital disc and the edges of the jacket.

After lamination, no fogging was seen and there was no offset of jacket materials onto the laminator, and there was no smearing of the leading or trailing portions of the image.

PARTS LIST transfer support 10
electrophotographic printer 12
transferable image 16
digital disc 18
transfer surface 14
face 22
transfer support-digital disc pair 20
lamination jacket 24
filled jacket 26
fuser 28
nip 30 feed rollers 32
heated plates 34
compliant fusing milers 36
leading drift 64
railing drift 66
arrows 101
fused transfer support-digital disc pair 20'
completed labelled digital disc 18'
shell 38
pocket 40
lower flaps 42,44
rear flap margins 46,48
axis of travel 50
separated configuration 52
hinge 56
arrow 58
insert 60
collar 62
leading edge section 64
trailing edge section 66
non-offset layer 68
moisture barrier layer 70
closed configuration 54
bottom 72
upper subunit 74,76,78
lower subunit 80,82,84
unitary upper half-insert 86
unitary lower half-insert 88
cut-out 90
configuration 52
guides 96,98
closed configuration 54

We claim:

1. A method for fusing a transferable image to a face of a digital disc, said method comprising the steps of:

printing said transferable image onto a transfer support;

registering said transferable image against said face of said digital disc to provide a transfer support-digital disc pair;

fusing said transferable image to said face of said digital disc; and keeping registry of said transferable image and said face of said digital disc during said fusing.

2. The method of claim 1 wherein said transfer support has a transfer surface in contact with said transferable layer, said transfer surface being of a material having a surface energy of less than about 25 dynes/centimeter.

3. The method of claim 1 further comprising maintaining a substantially uniform pressure on said transfer support-digital disc pair during said fusing.

4. The method of claim 1 wherein said fusing step further comprises roller laminating said transferable image to said face of said digital disc.

5. The method of claim 1 wherein said keeping step comprises:

jacketing and transfer support-digital disc pair during said fusing step.

6. A lamination jacket for use in transporting a transfer support bearing a transferable image and a digital disc through the nip between a pair of compliant rollers to heat and pressure fuse the transferable image to the face of the digital disc, said lamination jacket comprising:

a insert;

a shell joined to said insert, said shell being exterior to said insert, said shell and said insert defining a pocket for closely receiving said digital disc;

at least one guide for registering said digital disc and said transfer support within said pocket.

7. The lamination jacket of claim 6 further comprising a digital disc guide and a transfer support guide for registering said digital disc and said transfer support, respectively.

8. The lamination jacket of claim 6 wherein said shell has front and rear margins defining an axis of travel and said pocket has a depth dimension substantially perpendicular to said axis of travel, and wherein said insert further comprises a leading drift adjoining said front margin and a trailing drift adjoining said trailing margin, said drifts each being disposed tangential to said pocket and transverse to said axis of travel, said drifts each having substantially the same dimensions as said pocket in a direction substantially perpendicular to said axis, said drifts each having a thickness substantially equal to said depth of said pocket.

9. The lamination jacket of claim 6 wherein said shell is substantially free from offset at a temperature and pressure sufficient to fuse said transferable image to said digital disc, and said shell being configured to at least substantially isolate said transferable image and said digital disc from said rollers.

10. A lamination jacket for use in heat and pressure fusing a transferable image to the face of a digital disc, said lamination jacket comprising a shell, first and second insert subunits joined to said shell, said insert subunits being displaceable between an open conformation and a closed conformation, said insert subunits being spaced apart in said open conformation, said insert subunits being juxtaposed in said closed conformation, said insert subunits each having a cut-out, said cut-outs each having an inner end and an outer end, said outer ends of said cut-outs being occluded by said shell, said inner ends being substantially aligned when said insert subunits are in said closed conformation, said cut-outs being configured to closely receive said transferable image and said digital disc when said insert subunits are superimposed, said insert subunits in said closed position having substantially the same thickness as said digital disc.

* * * * *